United States Patent
Rosenberg

[11] Patent Number: 6,127,615
[45] Date of Patent: Oct. 3, 2000

[54] STRINGED-INSTRUMENT PRACTICE DEVICE

[75] Inventor: Ralph Jay Rosenberg, Enosburg, Vt.

[73] Assignee: Twanger, Inc., Enosburg, Vt.

[21] Appl. No.: 09/122,018

[22] Filed: Jul. 24, 1998

[51] Int. Cl.[7] .................................... G09B 15/06
[52] U.S. Cl. ...................... 84/465; 84/267; 84/297 R; 84/314 R; 84/315; 84/470 R
[58] Field of Search .............. 84/267–269, 274, 84/297 R, 297 S, 314 R, 314 N, 315, 465, 723–725, 730, 737, 743, DIG. 24, 470 R

[56] References Cited

U.S. PATENT DOCUMENTS

| | | | |
|---|---|---|---|
| 1,848,920 | 3/1932 | Watson | 84/173 |
| 4,065,995 | 1/1978 | Greer | 84/465 |
| 4,112,804 | 9/1978 | Cecchini | 84/173 |
| 4,292,874 | 10/1981 | Jones et al. | 84/1.03 |
| 4,364,298 | 12/1982 | Piazza | 84/465 |
| 5,756,914 | 5/1998 | Streibl | 84/465 |
| 5,811,704 | 9/1998 | Anderko | 84/470 R |
| 5,837,912 | 11/1998 | Eagen | 84/267 |

*Primary Examiner*—Robert E. Nappi
*Assistant Examiner*—Marlon T. Fletcher
*Attorney, Agent, or Firm*—Elman & Associates

[57] ABSTRACT

A stringed-instrument practice device for improving a player's rhythm-hand technique involved in playing a stringed instrument. Such a device may have a generally rectangular base including a plurality of tunable strings. The base has two rests thereon with a series of fixed screws for fixing one end of each string and a series of adjustable screws for attachment to the other end of each string. Adjustment of the adjustable screws allows adjustment of the tension in each string. The practice device is desirably fitted with a transducer/microphone that allows connection of the instrument to an external amplifier and may have an in-built rhythm generator, amplifier, earphone jack or speaker, and controls therefor incorporated into the device.

19 Claims, 5 Drawing Sheets

STRINGED-INSTRUMENT PRACTICE DEVICE

FIELD OF THE INVENTION

This invention relates to the field of stringed musical instruments, and more particularly to a finger exercise practice instrument simulating a stringed-instrument on which players may practice rhythm-hand techniques.

BACKGROUND OF THE INVENTION

Many devices for teaching the playing of guitar, mandolin, ukulele or other stringed instruments are known. U.S. Pat. No. 2,145,718, to Finney, discloses a movable slide positioned on runners together with a punch card that produces particular chords in particular keys of music. Another training device is disclosed in U.S. Pat. No. 3,218,904, to Hartman. Hartman discloses a training device which is adapted to fit under the strings of a guitar neck and which contains identification for particular chords. Still another device is disclosed in U.S. Pat. No. 3,494,240, to Laselva et al. Laselva et al., disclose a hollow box with a single bridge together with strings of different diameters to illustrate the physics involved in the production of tones. Yet another device is disclosed in U.S. Pat. No. 4,056,995, to Greer. Greer discloses a hollow chamber which emulates a portion of a guitar fret-board together with a series of frets so as to permit a player to practice finger exercises in order to improve their finger strength. Another device is disclosed in U.S. Pat. No. 4,112,804, to Cecchini. Cecchini discloses a sound chamber provided with a removable finger board stored therein. The Cecchini device is disclosed to be used for "right-hand" practice as a sound chamber and with the finger board for "left-hand" practice. Still another device is disclosed in U.S. Pat. No. 5,756,914, to Streibl. The Streibl device emulates a portion of a guitar fret-board in which the distance of the strings from the fret-board may be adjusted to train and strengthen the fingers of a player.

None of the aforementioned devices is adapted to provide a teaching device for serious students of stringed instruments that allows students to identify and attack rhythm-hand problems and practice rhythm-hand techniques.

SUMMARY OF THE INVENTION

An object of the disclosed invention is to provide a finger exerciser and training device for musicians who play stringed musical instruments, such as guitars, that provides a direct or amplified acoustic output to facilitate practice and improvement of rhythm-hand techniques.

The device disclosed herein has a small, preferably rectangular, base having mounted thereon a plurality of playable strings. Devices of the present invention are designed to permit a player to practice primarily the rhythm-hand technique involved in playing a stringed-instrument. Devices of the present invention may also be used as instruments.

As used herein, "rhythm-hand techniques" encompass the actions of a hand, the fingers of which produce the sound from the string of a stringed-instrument by contacting, moving, stretching and releasing the string. Generally, for stringed-instrument players the dominant hand (usually the right hand) is the rhythm hand. The strings of an instrument are worked by the bare fingers of the rhythm hand or with an implement such as flat pick or plectrum, or with finger picks worn on the thumb and finger.

Rhythm-hand techniques include picking, finger picking, flat picking, muting, strumming, slapping, popping, tapping, thumping, thumbing and rubbing. Any of these techniques may be used to play a variety of music styles including rock, folk, classical, flamenco, reggae, jazz, blues, swing, country, etc.

In rhythm-hand techniques, the speed, strength, precision, and endurance of the fingers is sometimes referred to as "chops." Another aspect of rhythm-hand technique is the manner in which the string is contacted, moved and released. Such actions are responsible in large part for the shape of the tone that is made. A soft smooth touch will make a mellow note. A brisk strong touch will make a lively energetic note. The speed, strength and precision of the rhythm hand will enable a player to produce a note synchronized with the music and with the proper volume, so as to create the desired effect. The ability to do these things smoothly and comfortably is part of what makes a good musician.

One embodiment of the present invention comprises a rectangular base having mounted thereon six playable strings. Each of the strings, is tensioned between a fixed screw located substantially at one end of the base and an adjustable screw located substantially at the other end of the base. Two rests, over which the strings are tensioned, are located adjacent to the ends of the base. The rests are positioned in grooves engraved in the base substantially adjacent to each end of the base. In this embodiment, one rest is thinner than the other, and the thinner rest is positioned adjacent to the fixed screws. The thicker rest is positioned in a shallow rectangular recess engraved into the solid base adjacent to the adjustable screws. In this embodiment the tension of each of the strings is adjustable by tightening or loosening the adjustable screw to which the string is attached, and the base of the device has loop fittings at each end to allow attachment of a cord or strap so that the device may be conveniently worn by a player.

Rests of the present invention may be made from plastics, such as nylon or DELRIN, brass, steel or other hard materials. Acoustic embodiments of the invention may have wooden rests.

Different embodiments of the stringed-instrument practice-device of the present invention may have any number of strings, e.g., three, four, five or six strings. Also, embodiments of the stringed-instrument practice-device of the present invention can have any number of strings such as three, four, five or six strings and each string may be doubled in the manner, for example, of a twelve-string guitar. Further, in different embodiments of the present invention the base is shaped and the strings are spaced, configured and sized to emulate an instrument such as an electric guitar having 6 or 12 strings, an acoustic guitar with steel or nylon strings having 6 or 12 strings, an electric or acoustic bass guitar having 4, 5, or 6 strings, a balalaika having 3 strings, a banjo having 4 or 5 strings, a mandolin, a ukulele, a zither, a dulcimer, a harp, a sitar, a pedal steel guitar, a violin, a viola, a cello, a bass, or indeed, any stringed musical instrument.

In embodiments of the present invention, tensioning of each string is achieved with an adjustable screw. The adjustable screws of the present invention preferably comprise a string-retaining nut and a string-tensioning screw. The string-retaining nuts of the present invention have a fine hole bored through the nut adjacent and parallel to the threaded bore of the nut. The end of a string is passed through the fine hole and wound about the string to attach it to the nut. In operation, the string-tensioning screw is passed through a hole bored in the base and engages the string-retaining nut so that rotation or counter-rotation of the screw moves the nut towards or away from the base. Accordingly, rotation or counter-rotation of the string-tensioning screw increases or decreases respectively the tension of said string.

The tension of the strings is adjusted by loosening or tightening the string-tensioning, or tuning, screw. As illustrated herein, turning the slotted string-tensioning screw on the back of the instrument clockwise tightens the string, and turning the screw counterclockwise loosens the string. It will, however, be appreciated by those of skill in the art, that left-hand thread screws that achieve the same adjustment by turning in the opposite direction are encompassed within the present invention.

Strings of the present invention are individually tensionable, enabling the user to adjust the tone and feel of each string to closely emulate the users preferred instrument.

The present device is preferably constructed with strings similar in composition and diameter to strings normally used on regular instruments. Additionally, preferred embodiments of the present device are constructed so that string spacing is similar to the spacing on regular instruments.

The wound end of each string may have a protective covering, such as glue from a glue gun or epoxy resin, to shield the sharp end and protect the fingers of a player. Embodiments of the present invention may be made entirely of non-toxic and non-removable components so that such embodiments are safe for the use of young children.

Generally, embodiments of the present invention have fittings at each end of the solid base for attachment of a cord or strap so that the device may be conveniently worn by a player. Certain embodiments of the present invention have fittings so that they may be worn as a belt-buckle, and other embodiments can be worn around a shoulder. Since only one hand is required to play an instrument of the present invention, the fittings provided on different embodiments improve the portability of the devices of the present invention and increase the variety of situations in which the instrument can be used.

The base of an acoustic embodiment of the present invention is preferably solid but may have decorative apertures therethrough. The base of an embodiment of the invention of the present invention adapted to provide electronic amplification of generated sounds may have a hollow therein to contain electronic components and may have perforations through the sides thereof to permit the passage of wires. The base of embodiments of the present invention may also be fancifully shaped as a cow, a tree, a guitar, a violin, etc., as in embodiments intended to be worn as a belt-buckle or as in embodiments intended as a musical toy for a child. Alternatively, the base may be made in any decorative shape.

The basic device of the present invention is rectangular wherein the width is determined by the spacing of the strings and the dimensions of the instrument being emulated, for example: a five-string bass is wider than a guitar embodiment, which in turn is wider than a banjo embodiment. Devices of the present invention may have lateral extensions to provide support for a playing hand. Generally, the length of a device of the present invention is sized to provide strings about twice as long as the playing area is wide. However, shorter or longer embodiments of the present invention are envisaged to provide different tensions and playability of the strings.

The base may be of any material sufficiently strong to withstand the tension of the strings. Such materials may be wood, laminates, plastics, fiberglass, metals, graphite composites, etc.

The base may be made flat, as in embodiments of the invention that emulate instruments wherein the strings are arrayed in a substantially planar manner, such as a guitar. In other embodiments of the invention, the solid base may have a convex surface so as to emulate the position of strings in an instrument wherein the strings are not arrayed in a planar manner, such as a violin.

A feature of the disclosed invention is that an embodiment thereof may provide facility for enhanced or amplified audio-feedback to allow a player to more easily analyze and develop their rhythm hand playing. Accordingly, certain embodiments of the present invention have an in-built transducer/microphone located in a recess in the base which enables sound vibrations from the strings of the device to be converted to an electrical signal that is fed to an in-built connector jack for connection to any kind of amplifier/speaker system. When playing an embodiment of the present invention with amplification, a player can more easily hear a generated sound, and more easily hear how the sound changes when he or she modifies the attack. The term "transducer/microphone" as used throughout the written description of the invention means a tranducer or microphone and corresponds to the term "transucer or microphone" as used in the claims.

In embodiments of the invention that incorporate a transducer/microphone, one rest is preferably solid and is located adjacent to one end of the base and usually adjacent to the fixed screws. The other rest is preferably hollow and located adjacent to the other end of the base. Generally, the hollow rest is positioned over the transducer/microphone located in the base, and the wires or electrical connectors from the transducer/microphone pass into the hollow rest through a hole drilled through the wall thereof and thence to a socket mounted in the end of the hollow rest. The receptacle or socket in the hollow rest accepts a standard connector jack. The strings of embodiments of the present invention are tensioned over, and vibrate between, the solid rest and the hollow rest.

A yet a further embodiment of the present invention, the base has a hollow therein with an electronic rhythm generator, an amplifier, a speaker, a power source and controls therefor mounted in the hollow. Such devices of the present invention with built-in rhythm generators, create a background rhythm and amplify the both the background rhythm and the sounds generated by the player so that a player may play along and keep time with background sounds. The side of the hollow base of such an embodiment of the invention houses an on-off switch, a volume control, a tone control, a rhythm-speed control, and a rhythm selector control, each of which is finger-adjustable from the outside of the device. A power source, such as a nine-volt battery, is housed within the hollow base, and a DC input jack is also desirably provided. A wiring harness within the hollow base provides connections between the electronic components of the device. The bottom of a hollow-base embodiment of the present invention is provided with a cover to enclose the electronic components.

In certain embodiments of this invention that provide amplification, a headphone output jack is provided in the side of the base and in other such embodiments a speaker is incorporated into the top surface of the base. Embodiments of the present invention that have an earphone jack may be used by a player of the instrument to practice with a minimal disturbance of others in the vicinity.

The rhythm-generator used in different embodiments of the present invention may have the function of a metronome to provide a simple beat with which a player keep time. In other embodiments the rhythm-generator may generate rhythms such as an 8-note beat, a 16-note beat, reggae, samba, rhumba, bossa nova, swing, bounce, disco, shuffle, rock, march, etc. Such rhythm generators are commercially available. In such embodiments, the rhythm selector control permits selection of a particular rhythm. Those of skill in the art will appreciate that any rhythm or beat that may be generated is within the spirit of the present invention.

Embodiments of the present invention are adapted for use with any standard metronome or "MiniAmp" (sometimes called practice amps or earphone amps). Such metronomes and MiniAmps are widely available from retailers and catalog vendors. Amplifiers can be used to allow a player to practice with recordings, with a metronome, or where the ambient noise is too loud to allow the player to hear the action of the fingers on the strings. Embodiments of the invention illustrated herein have a standard ⅛ inch output socket for a mono plug such as a mini phone jack. Adapters may be used to allow use of the present invention with amplifiers with ¼ inch plugs.

Different embodiments of the present invention may emulate the playing position of any kind of stringed instrument by modification of the shape of the solid base, and by varying the spacing, size and configuration of the strings.

It is an advantage of the present invention that such devices are compact, simple and portable, and can be used anytime and anywhere. They are manually operated, with or without amplification, and make little intrinsic sound. Accordingly, devices of the present invention can be used without disturbing others. The disclosed invention provides the musician, whether beginner or advanced, the ability to practice at will and to determine his practice workout routine. Practice wit devices of the present invention results in great proficiency and skillful rhythm-hand finger control regardless of musical style, i.e., rock, classical, etc. No tuning or other accessories are necessary to make the device ready for use. Devices of the present invention can be used to aid a musician in memorizing and executing difficult passages and in building finger speed, strength, precision, endurance and other rhythm-hand techniques.

A particular object of the present invention is to provide a practice instrument that isolates and focuses on certain aspects of playing technique, i.e., rhythm and touch, while minimizing or eliminating other aspects, i.e., melody and pitch. Thus, the present invention advantageously enables a player to practice rhythm-hand exercises when he or she is unable to use a regular instrument. The present invention, either directly or with the aid of amplification, informs a player about his or her attack, i.e., exactly when and how the strings are being hit, and the "shape" of the notes being generated. With the present invention a player can clearly hear and focus on rhythm-hand aspects of playing without the added complication of the tone and pitch information.

A further object of the present invention is to provide a portable, compact practice instrument. Players find the present device, handy, and enjoyable to use. Additionally, the use of the present device allows a player to develop extra "finger miles" when an actual instrument would be awkward or impossible to use.

Devices disclosed herein are played with only the rhythm hand, are simple to play and allow the player to concentrate on the action of that hand. The strings of the present invention are made very short and, accordingly, are extremely sensitive to very small variations in touch and timing. Good, experienced players notice imprecision in their finger actions when using the devices of the present invention. Thus, an advantage of the present invention it to reveal such imprecision and make it audible so that a player can determine its source and, by practice, learn how to control and improve rhythm-hand playing skills. With a device of the present invention a player can break down a series of motions into parts, decide which parts are causing trouble, invent an exercise to strengthen the weak area and practice to eliminate the problem, i.e., "put on the miles." Each time a player does this, technique is improved and greater capacity for musical expression is developed.

Devices of the present invention advantageously allow stringed-instrument players to identify clumsy, rough, or "just not right" targets for improvement by listening to a riff or passage and noticing the weak spots. Many players will find that passages they often play will have sections that "sound bad" when played on devices disclosed herein. These devices help to identify such sections and permit analysis and improvement thereof. With the present devices, patterns of play may be broken-down to simpler elements, which may then be worked on to eliminate the trouble. Once simpler elements have been perfected, they may be put together to create more complex sound patterns.

The strings of the devices disclosed herein may be tensioned so as to create a feel that emulates the feel of a full size instrument. Usually this will make the sound somewhat atonal, like a "thunk," similar to the sound of a drum. Such a tuning is useful for practicing along with recorded music because the atonal sounds do not clash with the harmonic music. Alternatively, the strings of a device may be tightened and tuned to pitch, though not to the same pitch as standard length strings. When tensioned this way, each string produces a tone which can be used in combination with the tones from the other strings to create interesting, enjoyable and novel practice patterns that can be played without background or along with a metronome.

A further advantage of the present invention is to allow a player to add to his or her musical vocabulary. Players of embodiments of the devices disclosed herein become smoother and more comfortable with the basic elements of their technique. The present invention may be used by alternating fingers on one string, alternating fingers on two or more strings, quarter note patterns, triplet patterns, eighth note patterns, shuffle, blues walk, reggae, and so on.

Devices of the present invention may be tuned in a variety of ways, for example, in an atonal manner to generate a sound similar to that of a drum, or tuned to pitch so that each string produces a tone which can be used in combination with the tones from the other strings to create interesting, enjoyable, and novel patterns. Accordingly, it is conceivable that musicians may chose to incorporate the sound of devices of the present invention into actual performances where the sound is appropriate to musical style.

For ease of illustration, embodiments of the present invention shown herein are for right-handed players. However, it will be obvious to those of skill in the art that embodiments of the present invention suitable for left-handed players may readily be assembled by reversing the order of the strings.

DETAILED DESCRIPTION

Figure 1:
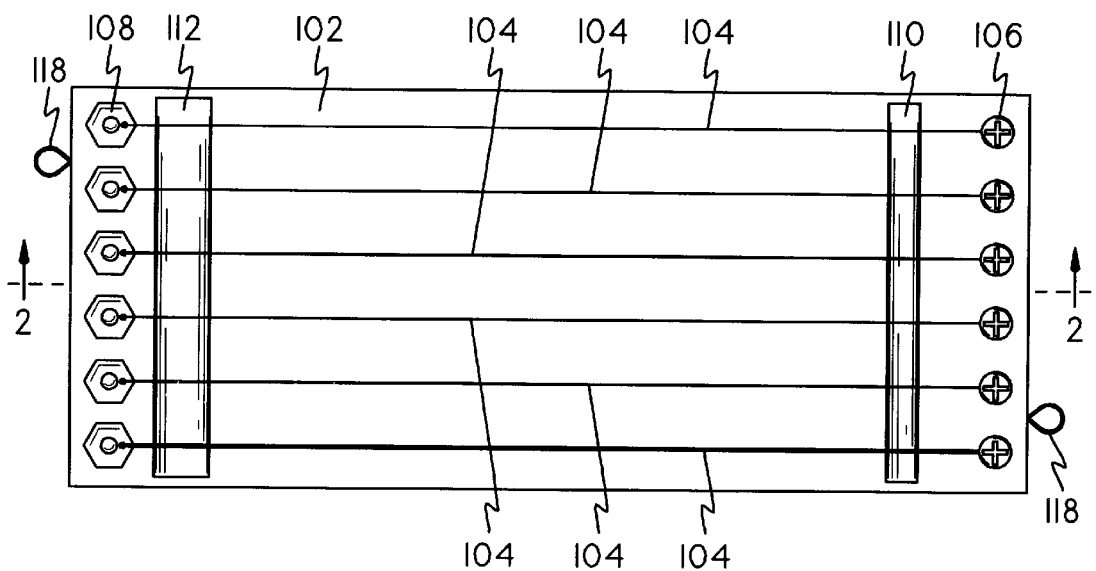
FIG. 1 is a plan view of a guitar embodiment of the present invention.

Referring now to the drawings and more particularly to FIG. 1, there is shown a particular embodiment of the present invention. FIG. 1 shows a base 102 with six strings 104 mounted thereon. Each string 104 is tensioned between a fixed screw 106 and an adjustable string-tensioning nut 108 and resonates between a first rest 110 and a second rest 112. At each end of the solid base 102 a loop fitting 118 is provided to allow attachment of a cord or strap (not shown) so that the practice device may be conveniently worn around the waist or over the shoulder of a player.

Figure 2:
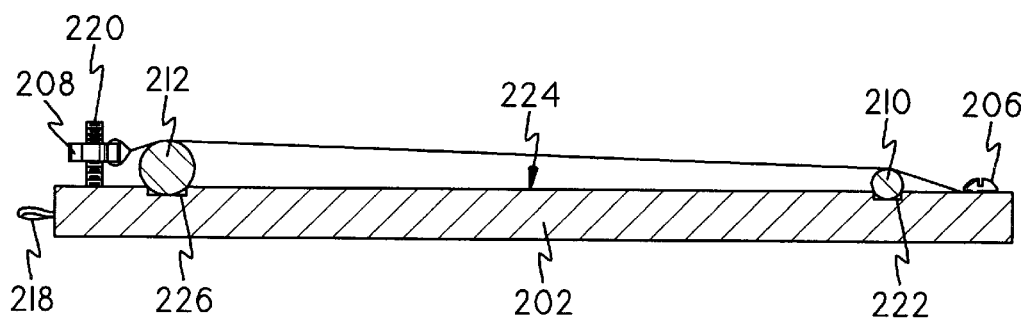
FIG. 2 is a longitudinal cross section taken through line 2—2 in FIG. 1.

FIG. 2 is a longitudinal cross-sectional view taken through line 2—2 of the embodiment of the invention shown in FIG. 1. FIG. 2 shows a cross-section of the solid base 202 with view of a string 204 tensioned between a fixed screw 206 and an adjustable string-retaining nut 208 threaded on a string-tensioning screw 220. The string 204 is shown resting over a solid first rest 210 and a solid second rest 212. The solid first rest 210 is positioned in a groove 222 engraved into the top surface 224 of the solid base 202 and the solid second rest 212 is positioned by a shallow rectangular recess 226 similarly engraved into the solid base 202. FIG. 2 also shows a loop fitting 218 at one end of the solid base 202.

Figure 3:
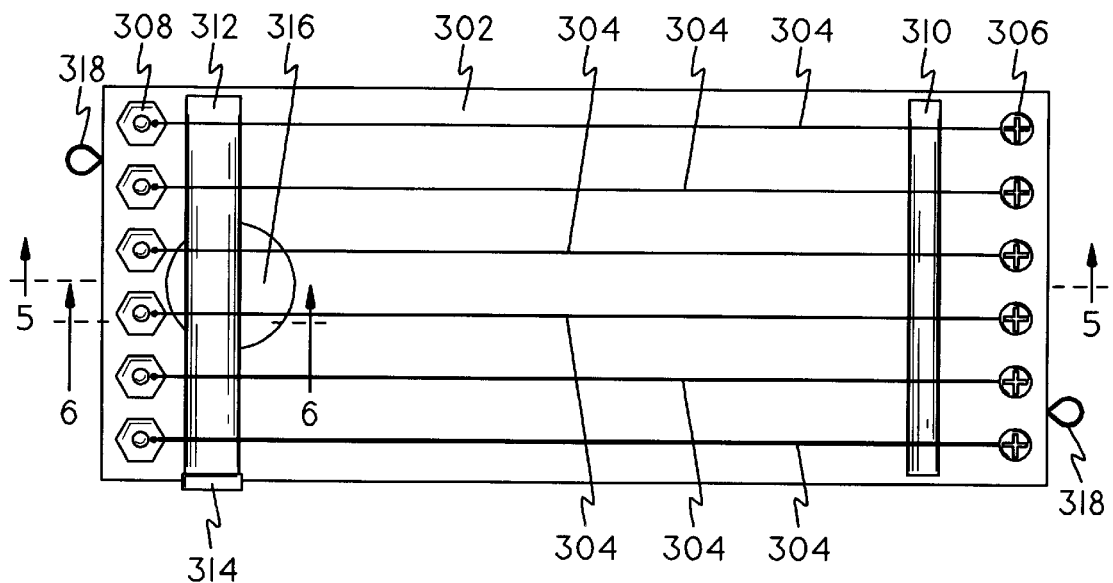
FIG. 3 is a plan view of a guitar embodiment of the present invention with a transducer/microphone.

Referring now to FIG. 3, there is shown an embodiment of the present invention with provision for output to an electronic amplifier. FIG. 3 shows a solid base 302 with six strings 304 mounted thereon. Each string 304 is tensioned between a fixed screw 306 and an adjustable string-tensioning nut 308 and vibrates between a solid first rest 310 and a hollow second rest 312. The second rest 312 has therein a receptacle or socket 314 for electrical connection to a standard connector jack (not shown). A transducer/microphone 316 is located beneath the second rest 312 and is connected electrically to the connector-jack socket 314. At each end of the solid base 302 a loop fitting 318 is provided to allow attachment of a cord or strap (not shown) so that the practice device may be conveniently worn around the waist or over the shoulder of a player.

Figure 4:
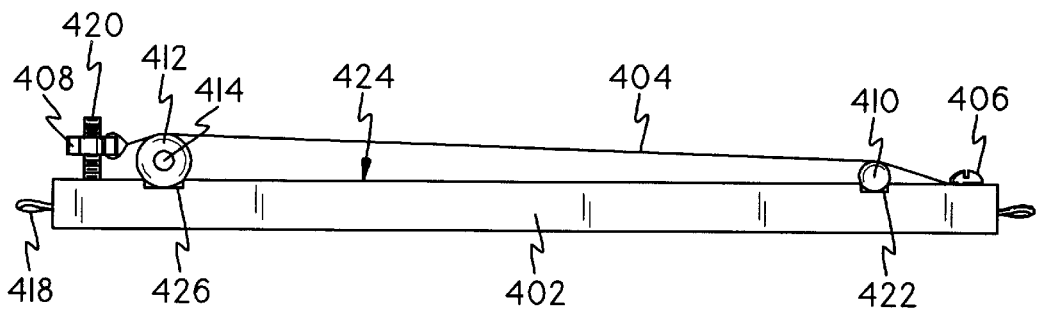
FIG. 4 is a side view of the embodiment of the present invention shown in FIG. 3.

FIG. 4 is a side view of the embodiment of the invention shown in FIG. 3. FIG. 4 shows the side of the solid base 402 with a string 404 tensioned between a fixed screw 406 and an adjustable string-retaining nut 408 threaded on a string-tensioning screw 420. The string 404 is shown resting over a solid first rest 410 and a hollow second rest 412. A socket 414 is shown in the end of the second rest 412 for electrical connection to a standard connector jack (not shown). The solid first rest 410 is positioned in a groove 422 engraved into the top surface 424 of the solid base 402 and the hollow second rest 412 is positioned by a shallow rectangular recess 426 similarly engraved into the solid base 402. FIG. 4 also shows a loop fitting 418 at one end of the solid base 402.

Figure 5:
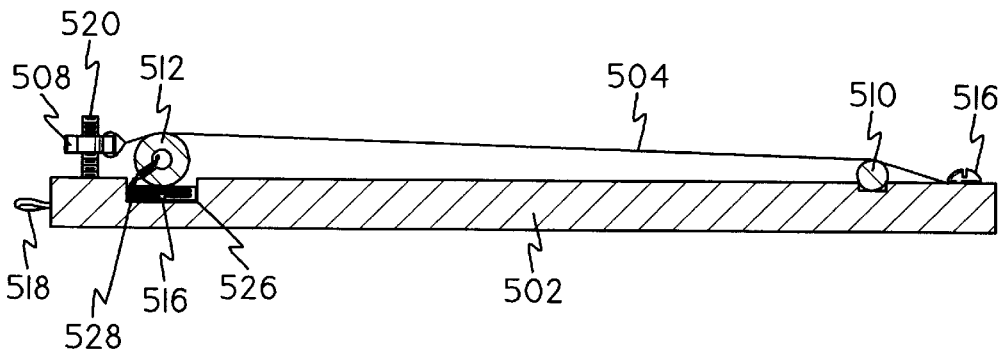
FIG. 5 is a longitudinal cross section taken through line 5—5 in FIG. 3.

FIG. 5 is a longitudinal cross-sectional view taken through line 5—5 shown in FIG. 3. FIG. 5 shows a cross section of a solid base 503 a first rest 510 and a second rest 512 also shown in cross-section. Wires 528 for electrically connecting a transducer/microphone 516 to a connector jack socket are shown diagrammatically. The transducer/microphone 516 is shown positioned in a recess 526, under the second rest 512. FIG. 5 also shows a view of the fixing of a string 504 through an adjustable screw-retaining nut 508 on a string-tensioning screw 520 and under a fixed screw 506. A view of a loop fitting 518 is shown at one end of the solid base 502.

Figure 6:
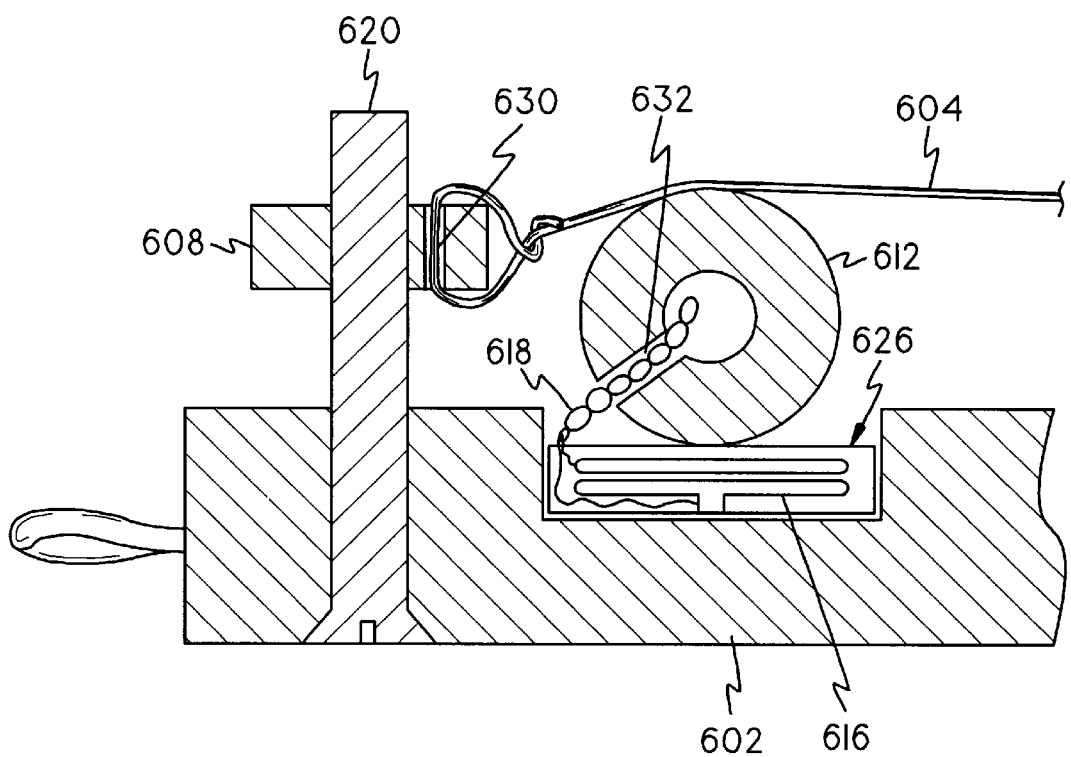
FIG. 6 is a partial cross section taken through line 6—6 in FIG. 4 showing a string-tension adjusting screw and the transducer/microphone pick-up.

FIG. 6 is an enlarged longitudinal cross-sectional view taken through line 6—6 shown in FIG. 3. FIG. 6, shows a portion of an end of a device of the present invention through a string-tensioning screw, 620 adjacent to a transducer/microphone 610. The string-tensioning screw 620 with an adjustable string-retaining nut 608 thereon is shown passing through a portion of the solid base 602. A portion of a string 604 is shown passing over a hollow rest 612 and interacting with the adjustable string-retaining nut 608 by passage through a drilled perforation 630 (shown dashed) therethrough. Adjacent to the string-tensioning screw 620 a recess 626 is shown with the transducer/microphone 616 positioned therein. FIG. 6 also shows the hollow rest 612 in cross-section and positioned resting on the transducer/microphone 616 which is shown diagrammatically. Wires 628 from the transducer/microphone 616 that connect to the connector jack socket for a connector jack (not shown) are shown passing through a hole 632 drilled in the wall of the hollow second rest 612.

Figure 7:
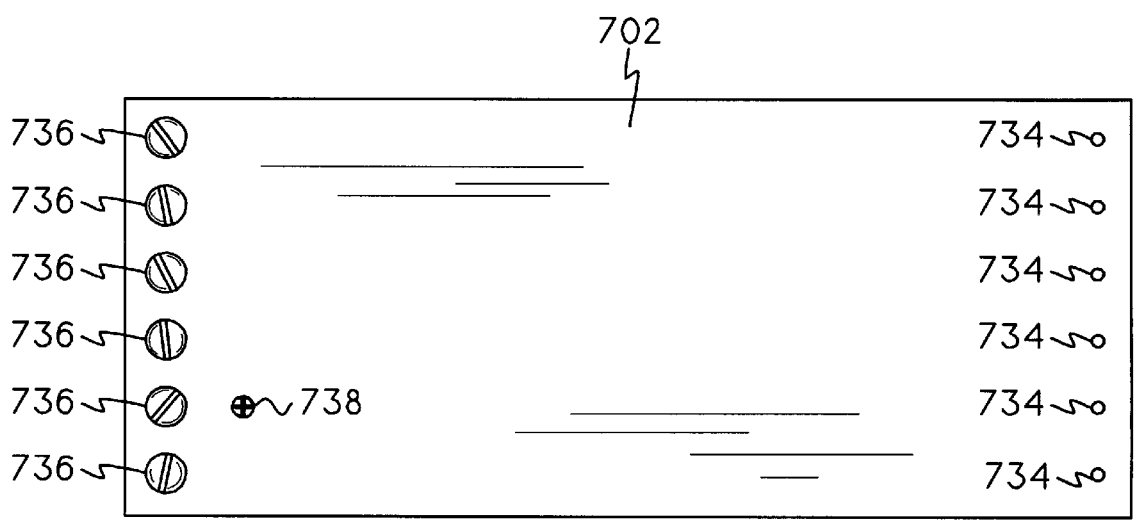
FIG. 7 is a view of the lower-surface of a guitar embodiment of the present invention.

Referring now to FIG. 7, a view of the lower surface of a device of the present inventions is shown. Apertures 734 are shown wherein reside the tips of fixing screws. Also shown are the heads 736 of string-tensioning screws and the head of a rest-fixing screw 738 used to firmly attach a hollow rest to the solid base 702.

Figure 8:
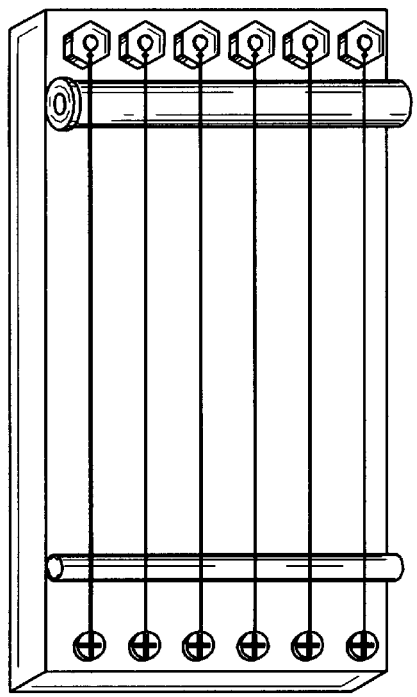
FIG. 8 is a perspective view of a guitar embodiment of the invention.
Figure 9:
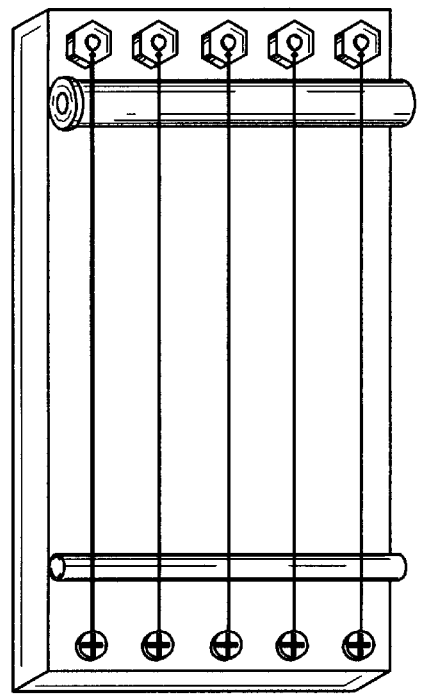
FIG. 9 is a perspective view of a five-string bass embodiment of the invention.
Figure 10:
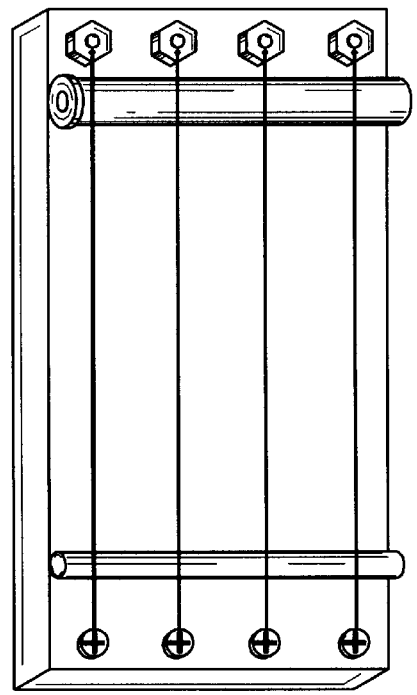
FIG. 10 is a perspective view of a four-string bass embodiment of the invention.

FIGS. 8, 9 and 10 show perspective views of different embodiments of the present invention. FIG. 8 shows a "guitar" embodiment of the invention having six adjustable strings; FIG. 9 shows a "five-string bass" embodiment of the invention having five adjustable strings, and FIG. 10 shows a "four-string bass" embodiment of the invention having four adjustable strings.

Figure 11:
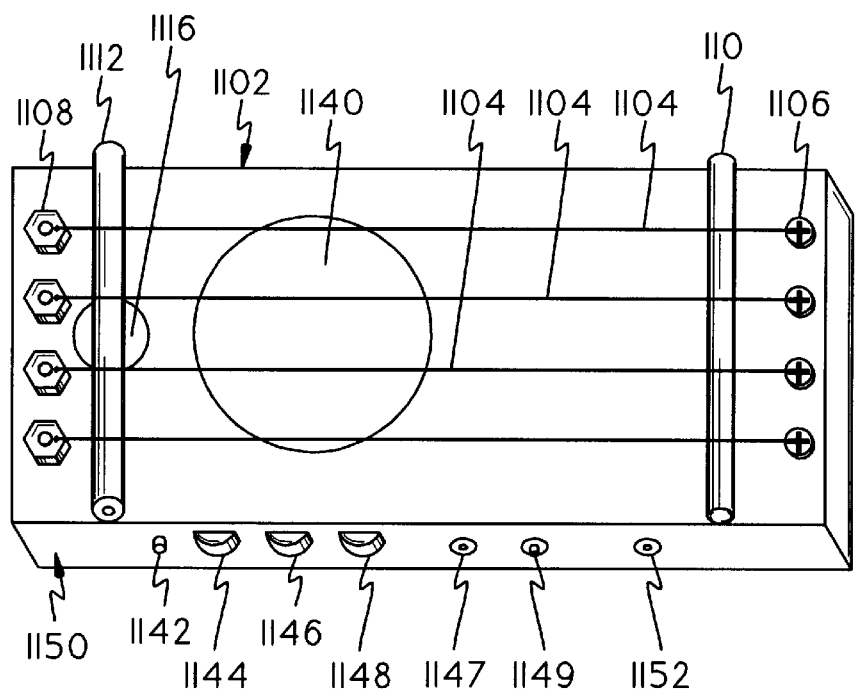
FIGS. 11 and 12 are perspective views of the top and bottom, respectively, of an embodiment of the invention having an in-built rhythm generator, amplifier and speaker system.
Figure 12:
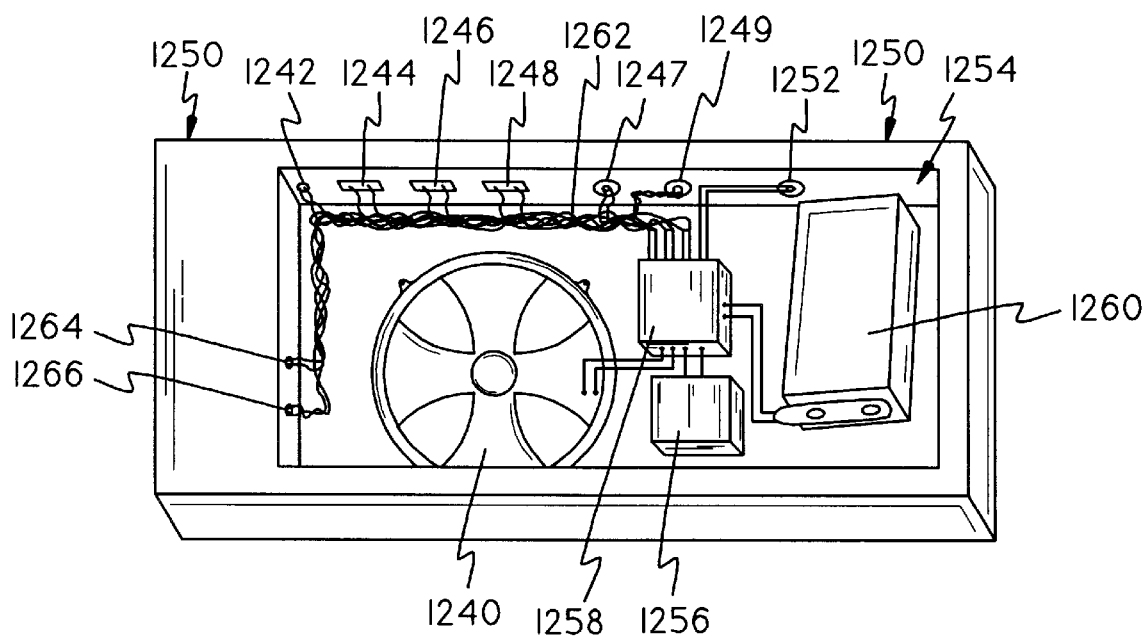

FIGS. 11 and 12 show perspective views of a hollow-base embodiment of the present invention that incorporates an electronic rhythm generator, an amplifier, a speaker, a power source and controls therefor shown. A transducer/microphone 1116 is located beneath the second rest 1112 and is connected electrically to the connector-jack socket 1114. A speaker 1140 is shown incorporated into the top surface 1124 of base 1102. An on-off switch 1142, a volume control 1144, a tone control 1146, an earphone output jack 1147, a rhythm-speed control 1148, and a rhythm selector control 1149 are shown on the side 1150 of the base 1102 together with a DC input jack 1152. Fittings (not shown) may be provided at each end of the solid base 1102 so that the practice device may be conveniently worn around the waist or over the shoulder of a player.

FIG. 12 shows a perspective view of the bottom of a hollow-base embodiment of the present invention without a cover that would enclose the electronic components in a fully assembled device.

FIG. 12 shows a view of the bottom of a hollow base 1202 with electronic components mounted in a cavity 1254 therein. A speaker 1240 is shown within the cavity 1254 in base 1202. An on-off switch 1242, a volume control 1244, a tone control 1246, an earphone output jack 1247, a rhythm-speed control 1248, and a rhythm selector control 1249 are shown on the side 1250 of the base 1202 together with a DC input jack 1252. Within the cavity 1254, a rhythm-generator circuit board 1256, an amplifier circuit board 1258, and a power source 1260 (illustrated as a 9-volt battery) are shown. Also shown is a wiring harness 1262 and connections between the electronic components of the device. Wires 1264 from transducer/microphone (1116 shown in FIG. 11) enter the hollow base 1202 and connect to amplifier 1258 and form part of wiring harness 1262 which also connects via the wires 1266 to the socket (1114 shown in FIG. 11) in the hollow rest (1112 shown in FIG. 11).

Although embodiments of the present invention have been described in some detail by way of illustration and example for purposes of clarity of understanding, it is understood that many changes and modifications may be made within the spirit of the invention.

I claim:

1. A compact stringed-instrument practice device comprising:
  a neckless base having mounted thereon a plurality of playable strings;
  for each of said plurality of strings, a fixed screw located at one end of said base for fixedly locating one end of said string and an adjustable screw at the other end of said base for locating the other end of said string, and
  two rests located adjacent to each end of said base; wherein:
    each of said strings is tensioned between one of said fixed screws and one of said adjustable screws;
    each of said strings rests on and is tensioned over said rests;
    said base has a fitting at each end adapted to attachment of a cord, belt or strap so that the device is worn by a player in position for practicing rhythm hand techniques; and
    said base forming an uninterrupted plane between said rests.

2. The device of claim 1 having three, four, five or six strings.

3. The device of claim 1 wherein:
  said adjustable screw comprises:
    a string-retaining nut, and
    a string-tensioning screw;
  an end of said string passes through a fine hole passing through said string-retaining nut and said end is secured to said string;
  said string-tensioning screw passes through said base and threadedly interacts with said string-retaining nut, and
  rotation or counter-rotation of said string-tensioning screw increases or decreases respectively the tension of said string by moving said string-retaining nut towards or away from said base.

4. The device of claim 3 wherein:
  all components of said instrument are non-toxic and non-removable, and
  said end of said string has a protective covering thereover.

5. The device of claim 1 wherein:
  said strings are spaced, configured and sized to emulate an instrument selected from the group consisting of an electric guitar having 6 or 12 strings, an acoustic guitar with steel or nylon strings having 6 or 12 strings, an electric or acoustic bass guitar having 4, 5, or 6 strings, a balalaika having 3 strings, a banjo having 4 or 5 strings, a mandolin, a ukulele, a zither, a dulcimer, a harp, a sitar, a pedal steel guitar, a violin, a viola, a cello and a bass.

6. A compact stringed-instrument practice device comprising:
  a base having mounted thereon a plurality of playable strings;
  a transducer or microphone with electrical connectors;
  for each of said plurality of strings, a fixed screw located at one end of said base for fixedly locating one end of said string and an adjustable screw at the other end of said base for locating the other end of said string;
  a solid rest located adjacent to one end of said base, and
  a hollow rest located adjacent to the other end of said base, said hollow rest having electrical connectors passing therethrough to a socket mounted therein; wherein:
    each of said strings is tensioned between one of said fixed screws and one of said adjustable screws;
    each of said strings rests on and is tensioned over said solid rest and said hollow rest;
    said transducer or microphone is located in said solid base and is connected electrically to said socket by said electrical connectors;
    said socket is connectable to an external amplifier and playback system, and
    said base has a fitting at each end to allow attachment of a cord, belt or strap so that the device is worn by a player in position for practicing rhythm-hand techniques; and
    said base forms an uninterrupted plane between said rests.

7. The device of claim 6, wherein:
  said transducer or microphone is located in a recess positioned beneath said hollow rest and said hollow rest retains said transducer/microphone in said recess.

8. The device of claim 6, wherein:
  said solid rest is located adjacent to said fixed screws, and
  said hollow rest is located adjacent to said adjustable screws.

9. The device of claim 6, having a number of strings selected from the group three, four, five and six.

10. The device of claim 6, wherein:
  said adjustable screw comprises:
    a string-retaining nut, and
    a string-tensioning screw;
  an end of said string passes through a fine hole passing through said string-retaining nut and said end is wound about said string;
  said string-tensioning screw passes through said solid base and threadedly interacts with said string-retaining nut, and
  rotation or counter-rotation of said string-tensioning screw increases or decreases respectively the tension of said string by moving said string-retaining nut towards or away from said solid base.

11. The device of claim 6, wherein:
  all components of said instrument are non-toxic and non-removable, and said end of said string has a protective covering thereover.

12. The device of claim 6, wherein said base is a hollow-base, and additionally comprising:

an electronic rhythm-generator;

an amplifier;

an earphone jack;

a power source;

a DC input jack;

on-off, volume and tone controls for said amplifier, and earphone jack;

an electronic-rhythm-generator speed control, a wiring harness connecting said electronic rhythm-generator, said amplifier, said transducer or microphone, said DC input jack, said earphone jack, and said on-off, volume, tone and speed controls, and a cover to enclose the electronic components.

13. The device of claim 12, additionally comprising a speaker and controls therefor.

14. The device of claim 12, wherein said rhythm-generator is a metronome.

15. The device of claim 12, wherein said rhythm-generator generates a rhythm selected from the group consisting of an 8-note beat, a 16-note beat, reggae, samba, rhumba, bossa nova, swing, bounce, disco, shuffle, rock and march.

16. The device of claim 6, wherein:

said strings are spaced, configured and sized to emulate an instrument selected from the group consisting of an electric guitar having 6 or 12 strings, an acoustic guitar with steel or nylon strings having 6 or 12 strings, an electric or acoustic bass guitar having 4, 5, or 6 strings, a balalaika having 3 strings, a banjo having 4 or 5 strings, a mandolin, a ukulele, a zither, a dulcimer, a harp, a sitar, a pedal steel guitar, a violin, a viola, a cello and a bass.

17. A method of using the stringed-instrument practice device of claim 1, in the absence of a stringed instrument of the kind customarily used by a player, comprising the steps of:

(a) tuning said playable strings so that the tension and feel of the strings resemble the tension and feel of the player's stringed instrument;

(b) attaching the device to a cord, belt or strap by means of the fittings at each end of the device so that the device is worn by the player in position for practicing rhythm-hand techniques; and (c) performing a rhythm-hand exercise on said stringed-instrument practice device, wherein the rhythm-hand pattern of a musical work is performed without simultaneously performing the melody-hand pattern.

18. A method of using the stringed-instrument practice device of claim 6, in the absence of a stringed instrument of the kind customarily used by a player, comprising the steps of:

(a) tuning said playable strings so that the tension and feel of the strings resemble the tension and feel of the player's stringed instrument;

(b) attaching the device to a cord, belt or strap by means of the fittings at each end of the device so that the device is worn by the player in position for practicing rhythm-hand techniques; and (c) performing a rhythm-hand exercise on said stringed-instrument practice device, wherein the rhythm-hand pattern of a musical work is performed without simultaneously performing the melody-hand pattern.

19. A method of practicing rhythm-hand techniques for use on a stringed instrument in the absence of a stringed instrument of the kind customarily used by a player, comprising the steps of:

(a) providing a stringed-instrument practice device comprising a base having mounted thereon a plurality of playable strings having adjustable tension that correspond to the playable strings of the player's stringed instrument;

(b) tuning said playable strings so that the tension and feel of the strings resemble the tension and feel of the player's stringed instrument;

(c) attaching the device to a cord, belt or strap by means of the fittings at each end of the device so that the device is worn by the player in position for practicing rhythm-hand techniques; and (d) performing a rhythm-hand exercise on said stringed-instrument practice device, wherein the rhythm-hand pattern of a musical work is performed without simultaneously performing the melody-hand pattern.

\* \* \* \* \*